EXPANDABLE CASE FOR CIRCUIT BOARDS AND INSTRUMENTS
Filed May 11, 1965
3 Sheets-Sheet 1
FIG. 1.
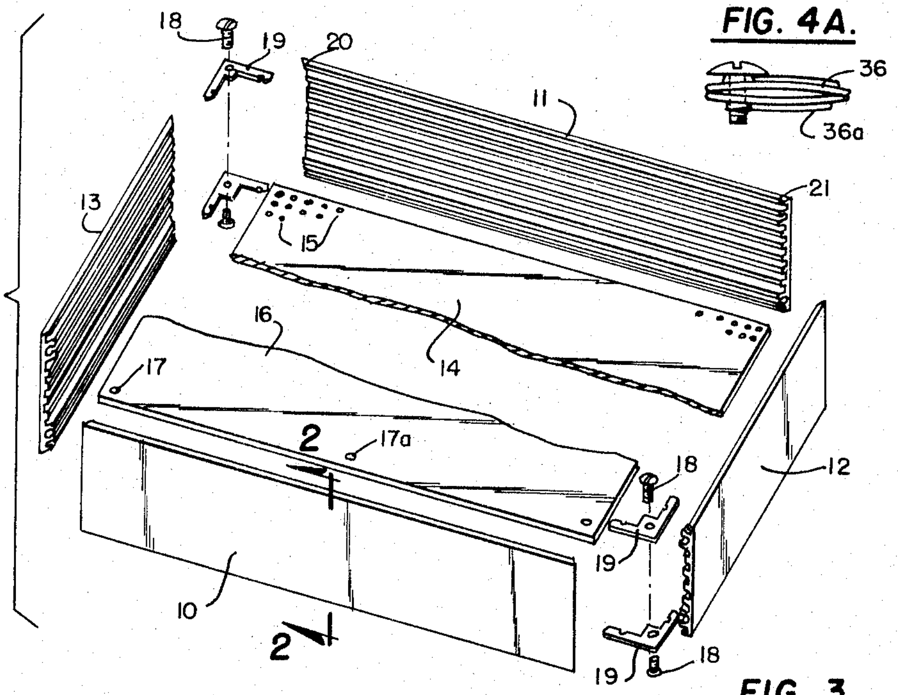
FIG. 1, FIG. 4A.
FIG. 6.
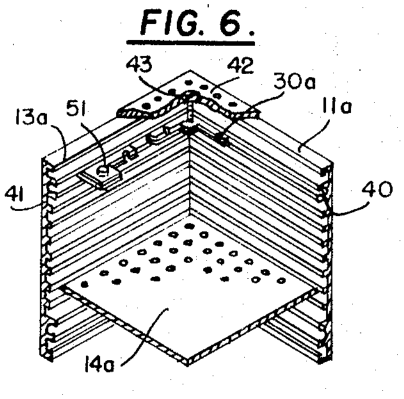
FIG. 2.
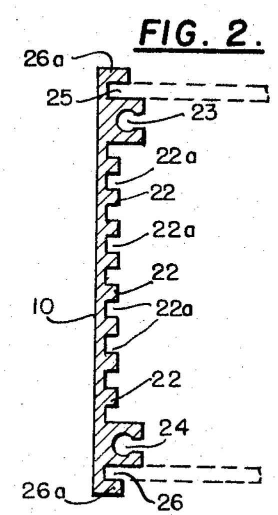
FIG. 3.
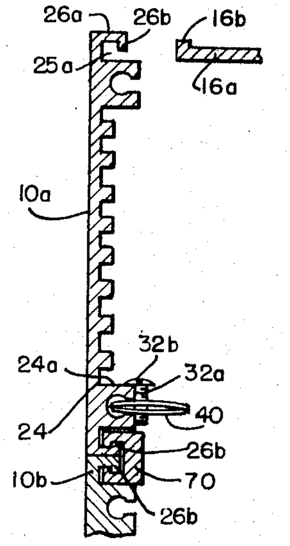
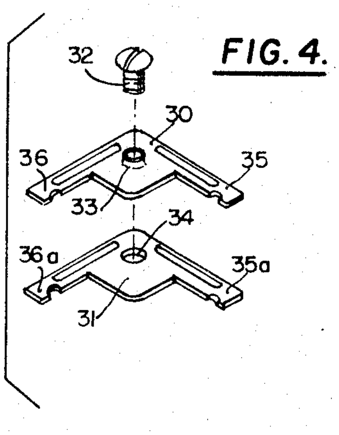
FIG. 4.
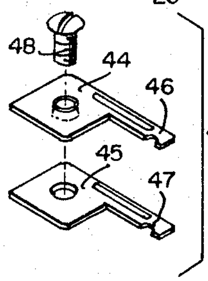
FIG. 5.
INVENTOR
Ray R. Scoville
BY Hall, Pollock & Vande Sande
ATTORNEYS

INVENTOR

Ray R. Scoville

BY Hall, Pollock & Vande Sande

ATTORNEYS

EXPANDABLE CASE FOR CIRCUIT BOARDS AND INSTRUMENTS

Filed May 11, 1965

INVENTOR
Ray R. Scoville
BY Hall, Pollock & Vande Sande
ATTORNEYS

United States Patent Office 3,316,460

Patented Apr. 25, 1967

3,316,460

EXPANDABLE CASE FOR CIRCUIT BOARDS AND INSTRUMENTS

Ray R. Scoville, 5083 Commonwealth Ave., La Canada, Calif. 91011

Filed May 11, 1965, Ser. No. 454,911

21 Claims. (Cl. 317—101)

The present invention relates to case or housing structures, and to elements for constructing the same, adapted to be used in various electronic, electrical, and instrumentation applications; and is more particularly concerned with improved casing arrangements comprising a plurality of standard case components which may be assembled in any desired configuration to provide a housing for experimental electrical set-ups, or for control circuits and/or instruments.

In the fabrication of various circuit arrangements, it is often highly desirable to provide a casing which serves to house a particular circuit, or to house an instrument or control unit. In general, it has been the practice for casings to have generally unitary configurations of predetermined sizes; and this has, in turn, required that a particular casing be chosen to accommodate a particular circuit. In the case of experimental work, this limitation of predetermined size has often resulted in experimental set-ups being unhoused since it is often difficult to anticipate the size of a final circuit arrangement, thereby making it impractical to keep a wide variety of differently sized housings in stock such as would be necessary to accommodate the various differently sized circuits which may be produced during a particular experimental program. This situation has, moreover, been complicated by the fact that, during an experimental program, it is often necessary to gain access to the circuits themselves, in order to monitor various parameters and/or to make changes in or additions to the circuit; and housings of the types suggested in the past, particularly in connection with finally engineered circuits and/or instruments, have not permitted such ready access to circuits or instruments contained therein.

In those instances where housings have been suggested which incorporate features permitting ready access to circuits or instruments contained therein, these features have in turn militated against use of a housing in a finally engineered circuit, i.e., a housing particularly designed for test purposes has not been considered an adequate housing for a final product and vice versa. This has, in turn, required that separate housing structures be kept in inventory for experimental purposes and for final products when both types of housings have been desired. This consideration has often resulted in no housings at all being kept in stock for circuit boards or instruments of an experimental nature; or has, alternatively, seriously increased the cost of an engineering program when it has been desired to house both developmental and finally engineered structures.

The present invention, recognizing these difficulties in housing structures suggested heretofore, is concerned with a highly improved housing arrangement comprising a plurality of standard housing components which may be readily assembled in any of a variety of configurations, and which permit the various housing dimensions to be readily expanded in any of several different directions so as to provide a housing configuration which may be altered as desired during a developmental program. As will appear, moreover, the standard components incorporated in the housing of the present invention are so constructed and arranged as to permit ready access to circuits and/or instruments contained in or on said housing, thereby permitting easy testing of such circuits or instruments as may be necessary. These standard components, and housings fabricated therefrom, are, moreover, so arranged that circuits may be variably mounted therein and readily changed in position therein so as to permit easy alteration of, addition to, or removal of, circuit portions from the housing without disturbing other portions of the structure contained within said housing.

In these respects, therefore, the present invention provides a readily expandable or dimensionally variable case in which experimental set-ups or circuit boards can be mounted, enclosed, tested, removed, etc., as is necessary in a practical program of experimentation. At the same time, the housing structure is such that, once a final circuit has been developed, the housing components of the present invention can be used to provide a functional case having the necessary rigidity required in a commercial product, i.e., the same standard components which are used to fabricate a housing for experimental purposes can also be used to provide housings for small finally engineered instruments or control units. In all instances, whether used for experimental or finally engineered products, the housing fabricated from the standard components to be described is highly attractive as well as functional, is sturdy and economical, and is devoid of all external screws or protuberances.

It is accordingly an object of the present invention to provide an improved housing structure for circuit boards and instruments.

Another object of the present invention resides in the provision of a housing or casing structure for circuit boards or the like, which housing or casing may be readily expanded or otherwise varied in size or dimension without detracting from the functional nature of the housing or from its appearance.

A still further object of the present invention resides in the provision of a housing comprising a plurality of components which may be readily assembled and disassembled, and in which selected portions of the housing structure may be removed without disturbing the structural configuration of the remaining portions, thereby to permit ready access to structures mounted within said housing as may be necessary during a period of experimentation, or for purposes of servicing or maintaining the housed assembly.

A still further object of the present invention resides in the provision of a housing structure for electrical or electronic circuits, particularly of the type comprising circuit boards, so arranged that said circuit boards may be carried within said housing without the need of any special additional supporting structures; and so arranged, moreover, that circuit boards may be readily inserted within, removed from, or relocated in the housing without requiring structural changes to the housing or to supporting means for said boards.

Another object of the present invention resides in the provision of a housing structure arranged to be readily assembled in any of a variety of temporary configurations, and incorporating means permitting any particular such arrangement to be adequately rigidified so as to provide a housing for more permanent purposes.

A still further object of the present invention resides in the provision of standard case components adapted to be used in conjunction with similar such case components to permit the fabrication of any of a wide variety of temporary or permanent housing structures, thereby permitting the stocking of such standard case components in place of complete housings.

In providing for the foregoing objects and advantages, the present invention contemplates housing structures fabricated of a plurality of standard, appropriately assembled, housing components. In its preferred form, the main portion of the housing comprises extruded aluminum side rails which may be provided in standard lengths and widths, and which are adapted to be easily plugged into one another to form a variety of rectangular frames adapted to enclose circuit boards and/or cover structures. Each of said extruded aluminum side rails preferably has a ribbed surface defining a plurality of longitudinal grooves; and the grooves in each such side rail are positioned to cooperate with similar such grooves in other side rails forming a complete case, so that circuit boards can be slidably inserted into and removed from the cases as desired. The side rails are, moreover, provided with means defining "key hole" channels or analogous such structures extending in spaced relation to one another and in spaced relation to the board supporting grooves. These "key hole" channels are, as will appear, adapted to receive various fittings permitting the side rails to be resiliently or permanently attached to one another, permitting cover structures to be permanently fastened to the housing if desired, and permitting various components to be mounted within the housing without requiring any change in the side rails themselves.

The fittings used for assembly and mounting purposes may, as will be described, take the form of resilient corner brackets operable to join two juxtaposed side rails in a 90° configuration relative to one another; may take the form of reverse corner brackets adapted to permit two side rails to be joined so as to exhibit an interior angle of 270°, thereby permitting the fabrication of housings having an L or U shape; may take the form of corner or side channels, or corner or side brackets, adapted to permit two cases to be mounted in side-by-side relation to one another, or in superposed relation to one another; may take the form of roll pins operable to permit two side rails to be longitudinally joined to one another, thereby to produce a side rail longer in dimension than the length of any particular standard side rail in stock; may take the form of slide nuts adapted to be disposed in the "key hole" channels at positions intermediate the ends of any particular side rail so as to facilitate the mounting of circuit boards, covers, or components; and may also take the form of self-tapping screws adapted to permit the mounting of various elements within or adjacent to internal or external portions of the housing such as may be needed in any particular assembly.

In short, by use of the standard case components and their cooperating fittings, the present invention permits the fabrication of any desired case configuration, and also permits ready variation in the size of any previously fabricated case, thereby making it practical for a research or manufacturing facility to house any of a wide variety of structures without the need of keeping a large inventory of completely assembled housings.

The foregoing objects, advantages, construction and operation of the present invention will become more readily apparent from the following description and accompanying drawings, in which:

FIGURE 1 is an exploded perspective view of a casing assembled from standard components constructed in accordance with the present invention;

FIGURE 2 is a cross-sectional view taken on line 2—2 of FIGURE 1, illustrating the configuration of a typical extruded member forming a side rail of a casing constructed in accordance with the present invention;

FIGURE 3 is a view similar to FIGURE 2, illustrating various modifications which may be made in the structure of the present invention to facilitate assembly of a housing;

FIGURE 4 is an exploded view of a typical corner bracket used to join two side rails at their corners;

FIGURE 4A is a side view, somewhat exaggerated, of a corner bracket of the type shown in FIGURE 4, when assembled;

FIGURE 5 is an exploded view of a typical slide nut such as may be employed in conjunction with the side rails of the present invention;

FIGURE 6 is a detailed view of a corner structure fabricated from a pair of side rails and associated with a corner bracket constructed in accordance with the present invention; and further illustrating the manner in which circuit boards and various fittings may be mounted in or on a housing of the type here involved;

FIGURE 14 is an illustrative view showing one way in which a corner bracket may be permanently locked to a side rail to form a more permanent housing structure in accordance with the present invention.

Figure 4B:
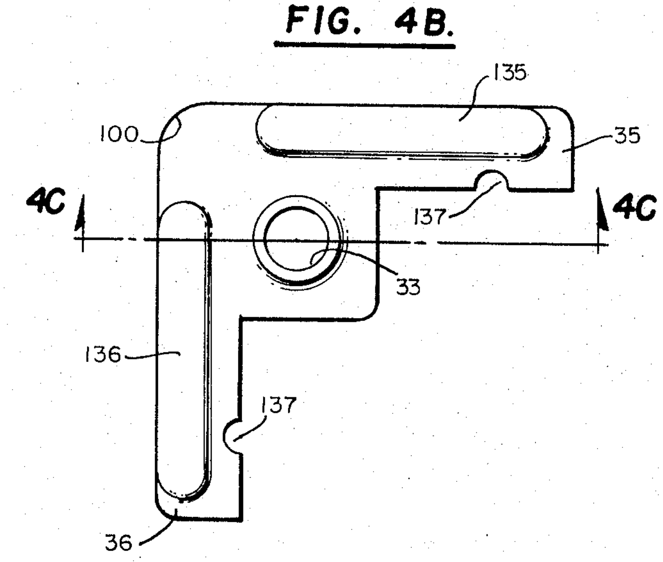
FIGURE 4B is an enlarged plan view of a typical corner bracket of the type shown in FIGURES 4 and 4A.

Referring now to the several figures, like numerals of which refer to like parts throughout, it will be seen that the housing components of the present invention are adapted to provide quickly assembled housings for a wide variety of electronic assemblies. Extruded aluminum side rails are provided, and can be manufactured and stocked in a number of given lengths and widths, for assembly by a manufacturer or test facility as may be desired to fabricate a housing of any particular shape and size. These standard aluminum side rails are adapted to be easily plugged into each other to form casing frames for supporting circuit boards and/or covers. Cases so formed may be readily expanded in width, length, height and shape, or may be stacked in side-by-side or superposed relation, as may be desired in any particular circumstance.

The enclosures or housings, formed by assembly of the standard components of the present invention, are sturdy and economical and, moreover, are devoid of external screws or protuberances, thereby giving them an extremely handsome appearance. In this respect, as will appear, the outermost surface of each side rail, when said side rail is formed of a metal, is preferably provided with a satin finish. The fittings used to keep the housing components in assembled relation are disposed entirely within the housing, and more particularly are located within bracket ducts forming portions of the extruded side rails, so that when the case is completely assembled, it has a finished, unbroken, highly attractive aspect.

The side rails are ribbed to provide longitudinal grooves forming supports for circuit cards, metal panels, or components at positions inside or on the outside of the case. The means used for assembling the casing structure are, moreover, so constructed and arranged that any desired portion of the housing may be readily removed from the remaining portions of said housing, so as to permit ready access to circuits, instruments, or components (particularly circuit boards) mounted within said housing. The assembly means provided for such purposes are, moreover, arranged to permit the housing portions to be effectively locked to one another when it is desired to tighten up the entire chassis, and rigidify it, for purposes of a more permanent installation.

Referring now to FIGURE 1, it will be seen that a typical housing constructed in accordance with the present invention may comprise a pair of side rails 10 and 11 adapted to form elongated sides of a rectangular housing frame, and a further pair of side rails 12 and 13, somewhat shorter in length than rails 10 and 11, adapted to form ends of the housing frame. Except for their length dimensions, the side rails 10 through 13 inclusive are of identical construction. More particularly, each said side rail comprises an extruded aluminum member having an outer attractively finished surface, and having an inner ribbed surface forming elongated grooves adapted to provide support for circuit cards and covers. A typical circuit card which can be so supported is illustrated in FIGURE 1 at 14 (see also card **14*a* in FIGURE 6), and comprises an insulating material preformed with a plurality of spaced apertures such as 15 adapted to receive various electrical components and wiring elements. The thickness of the circuit card 14 is preselected to correspond to the spacing between the ribs formed in a given side rail such as 10; and said circuit card also exhibits length and width dimensions corresponding to the spacing between opposed rails 10–11 and 12–13. As a result, a circuit card such as 14** may be slidably inserted into the housing, or slidably removed therefrom along said side rail grooves, when desired.

The assembly shown in FIGURE 1 may further comprise satin finished metallic covers, a typical one of which is illustrated at 16; and such covers can be disposed adjacent the bottom and top of the assembled housing, or at one only of these locations, as may be desired. The cover structures, such as 16, can be slidably disposed within grooves formed in the various side rails, and said covers may be provided with corner holes such as 17 adapted to receive screws such as 18 fitting into corner brackets 19, the construction of which will be described in more detail subsequently in reference to FIGURES 4 and 4A through 4C.

Each of the side rails 10–13 has its opposing narrower ends mitre cut at an angle of substantially 45°, e.g., as noted at the ends 20 and 21 of side rail 11 (FIGURE 1). Moreover, each of the side rails 10–13 has an identical disposition of interior grooves extending, preferably continuously, between the said mitre cut narrower ends of said side rail. As a result, upon assembly of the several side rails, the ribs and intervening grooves in any given side rail mate accurately with identical such ribs and grooves, respectively, provided in an adjacent such side rail. Any three adjacent sides of the frame produce a plurality of superposed U-shaped grooves; and a board such as 14 may, accordingly, be slidably inserted into, and removed from such a groove as desired.

The interior ribbed, or grooved, construction of a typical side rail, such as 10, is illustrated in FIGURE 2. Ribs 22, formed, for example, during extrusion of the side rail 10, extend outwardly from the inner surface of said side rail, and define therebetween a plurality of longitudinal board supporting grooves **22*a* spaced from one another along a central portion of the side rail. In a typical case, each of the grooves 22*a* may exhibit a dimension of 0.1″ in width. The extruded interior surface of the side rail 10, moreover, includes further pairs of outstanding ribs located adjacent the upper and lower elongated edges of the side rail, and forming a pair of elongated bracket ducts or "key hole" slots designated 23 and 24. As is apparent in FIGURE 2, the ribs forming bracket ducts 23 and 24 extend outwardly from rail 10 a distance greater than the ribs forming grooves 22*a*. The bracket ducts 23 and 24 are adapted to receive various fittings of types to be described hereinafter, for assembling side rails in any desired configuration, or for attaching components either interiorly or exteriorly of the case. A further pair of grooves 25 and 26 are disposed adjacent the upper and lower ends of the side rails, outside of the bracket ducts 23 and 24. These further grooves 25 and 26 are formed between the bracket ducts and inwardly extending flanges 26*a* positioned adjacent the upper and lower edges of the side rail 10; and said grooves 25, 26** are adapted to receive covers or circuit boards forming outermost portions of the housing.

The extruded ribbed and grooved structure shown in FIGURE 2 is, of course, subject to certain modifications within the principles of the present invention. In FIGURE 2, the overall height of a typical side rail may be in the order of two inches; but variations in this height may be provided. Similarly, the number of grooves **22*a* which are located between the pair of spaced bracket ducts 23 and 24 may also be varied. The internal dimensions of these grooves 22*a*** may likewise be varied, all in accordance with the particular circuit board elements, or components, to be mounted thereon.

The various grooves or slots **22*a*, 25 and 26 have been depicted in FIGURE 2 as having a substantially rectangular cross section; but other shaped grooves may be provided, particularly if it is desired to effect a more secure retention of circuit boards and/or covers inserted into such grooves. A modification of this type has been illustrated in FIGURE 3 in which the flanges 26*a* forming groove 25*a* (otherwise corresponding to groove 25 of FIGURE 2) are provided with an inwardly extending lip 26*b*. Such a modified groove can be associated with a cover such as 16*a* having flanged edges 16*b* adapted to lock into the groove 25*a* behind lip 26*b*. Similar such modification of the groove cross-section can be effected in the grooves 22*a* and 26** of FIGURE 2, or in selected ones of said grooves, so as to rigidify the structure and inhibit its spreading apart so long as at least one circuit board or cover is kept in place in relation to three adjacent side rail members. By modifications of these types, one end or side of the housing can be removed, and one or several circuit boards can also be removed, without affecting the rigidity of the frame.

The primary function of the bracket ducts 23 and 24 is to receive various fittings intended to keep side rail members in any desired assembled relation, or to receive other fittings adapted to facilitate the mounting or attachment of components or covers. A corner structure, in a housing fabricated from side rails such as have been described in reference to FIGURES 1, 2 and 3, is formed by associataing a resilient corner bracket with each pair of mating bracket ducts at a typical such corner. A corner bracket, of this type, is illustrated in FIGURES 4 through 4C. More particularly, such a corner bracket preferably comprises a pair of stamped L-shaped members 30 and 31 adapted to be placed upon one another, and adapted to receive a screw member 32 passing through threaded apertures 33 and 34 (see FIGURE 4). Each of the corner members 30 and 31 comprises a pair of arms, such as are designated 35, 36, and **35*a*, 36*a*; and these pairs of arms are preferably bowed somewhat in opposite directions to one another on the two corner members 30 and 31 so that, upon being assembled, the overall corner bracket takes the configuration shown in FIGURE 4A. More particularly, as will be seen in FIGURE 4A, a pair of superposed arms, such as 36 and 36***a* are so bowed with respect to one another that the resulting arm structure is resilient in nature, thereby causing the arms of the corner bracket to firmly engage the bracket ducts of a pair of adjacent side rail members.

Figure 4C:
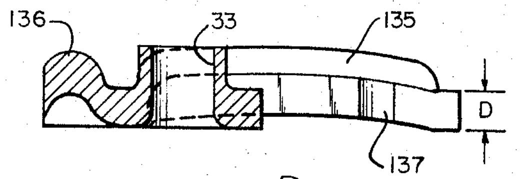
FIGURE 4C is an enlarged, somewhat exaggerated, view taken on line 4C—4C of FIGURE 4B.
Figure 4C:
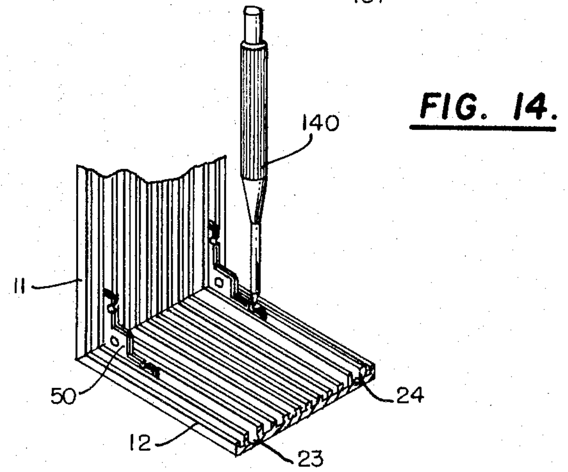

FIGURES 4B and 4C further illustrate various aspects of the corner bracket shown in FIGURES 4 and 4A, to a somewhat enlarged and exaggerated scale. Each of the arms 35 and 36 is actually substantially three-fourths of an inch in length; and said arms are joined to one another by a smoothly curved exterior edge 100 having a radius of substantially three-sixteenths of an inch. Each of the arms 35 and 36 is further provided with an outwardly bulged portion such as 135 and 136 which (as best illustrated in FIGURE 4C) preferably describes a substantially semi-circular cross-section. When two members of the type shown in FIGURE 4B are superposed (e.g., as illustrated in FIGURE 4), the opposing portions 136 (and 135) thus form substantially circular protrusions which frictionally engage interior surfaces of the bracket duct to provide good engagement between the corner brackets and said bracket duct. Each protrusion such as 135 or 136 preferably has a height of substantially .053 inch from the bottom surface of a typical corner bracket piece such as is illustrated in FIGURES 4B and 4C; and each such protrusion or dimple 135, 136 preferably has an outside radius of substantially 0.062 inch. In this respect, it might be noted that the thickness of the corner bracket, as designated, for example, D (FIGURE 4C) is substantially 0.029 inch.

Approximately one-eighth inch from the outermost end of each leg 35 and 36, the interior edge of the leg is provided with an arcuate depression 137 having an interior radius of, for example, 1/32 inch. These depressions 137 are provided as a means of locking a corner bracket into engagement with a side rail; and, more particularly, as will be described subsequently in reference to FIGURE 14, a portion of the side rail can be manually deformed so that metallic portions of a side rail rib protrude into depressions 137 thereby preventing the legs 35 or 36 from sliding in the bracket ducts of a rail so deformed. This permits a user of the structure to effect a permanent lock-up between the corner brackets and side rails, when desired, so as to give an extremely rigid and permanent type of housing construction.

To assemble an enclosure utilizing side rails and corner brackets of the types thus far described, the desired lengths of side rails are first selected, whereafter corner brackets are pushed into the bracket ducts. More particularly, the arms 35–35*a* (FIGURE 4) of a corner bracket may be pushed into the bracket duct of a rail such as 11 (FIGURE 1), and the arms 36, 36*a* of said corner bracket may similarly be pushed into the end of the bracket duct in side rail 13. The corner bracket arms resiliently engage the bracket ducts of the side rails, thereby providing a firm juncture between the adjacent side rails in the region of their bracket ducts. It will be appreciated, of course, that corner brackets of the types described are preferably provided in association with each of the bracket ducts so that there would be two such corner brackets at each corner of the assembly. It will further be appreciated that, since the arms of the corner brackets are slidably inserted into the bracket ducts, the side rail of a given housing can be pushed together, by pushing each of the resilient arms longitudinally into its associated bracket duct. It will similarly be appreciated that, since the juncture at each corner of the housing is resilient and slidable in nature, any given side or end of the housing can be removed simply by pulling outwardly on that member.

To completely assemble an enclosure, resilient corner brackets of the types described in reference to FIGURE 4 are inserted into the bracket ducts at each corner of the assemblage. The side rails can then be manually pushed together. In practice, it is preferable to leave the side rails initially separated by a small amount sufficient to facilitate the insertion of boards or metal covers into their supporting grooves; but once such insertion of boards or covers have been effected, the side rails can be pushed fully together at their corners, thereby achieving a firm junction at each corner of the structure operative to keep the housing in assembled relation, and further operative to maintain the circuit boards and cover structures in place.

If it is desired to effect a more permanent joint, the screws such as 32, associated with each corner bracket, can be turned down so as to bind on the upper or lower adjacent edge of the mating bracket ducts. This particular consideration is shown in FIGURE 3 wherein the screw member 32*a* associated with a typically inserted corner bracket 40 is depicted as having its head 32*b* in firm engagement with an adjacent surface 24*a* of the bracket duct 24. This engagement between head 32*b* and surface 24*a* of the bracket duct prevents the resilient corner bracket 40 from sliding in its associated bracket duct. When a pair of side rails are assembled at a corner, the head 32*b* of a screw such as 32*a* will overlie surfaces such as 24*a* associated with each side rail, due to the close fit provided at the corner of an assembled structure, and due to the positioning of the screw member 32 in a typical corner bracket. The head 32*b* of any single screw, when turned down hard, will therefore bind on a pair of surfaces, analogous to 24*a*, associated with a juxtaposed pair of side rails. The screw 32*a*, 32*b* thus provides a means for readily locking the housing structure at its corners, and prevents the side rails from being moved apart when it is preferred that such movement not be effected.

Similar results may be achieved by crimping the corner bracket arms 35, 35*a* and 36, 36*a* to their associated bracket ducts, for example, by means of a center punch, when permanence is desired. This type of locking arrangement, and the procedure for effecting the same, is best illustrated in FIGURE 14. The crimping or corner bracket locking illustrated in FIGURE 14 should be effected before the panels are slipped into place; and such crimping or locking results in a case having rigid, permanent characteristics. The various side rails (without panels) are first assembled with corner brackets of the types previously discussed, and are then pushed together. The corner brackets are adjusted in proper position to obtain good corners. The legs of the corner brackets are, at this time, so disposed that their indentations or depressions 137 are located closely adjacent the outer edges of the ribs forming bracket ducts 23 and 24. Then, employing a center punch 140 (preferably of the spring impact type) one may indent the walls of one or both of the side rail ribs forming said bracket ducts 23 and 24 so that portions of the rail material are deformed into the corner bracket depressions 137. It should be noted, of course, that such locking need not be accomplished adjacent both side rails 11 and 12, and can, if desired, be effected between one side rail only and its associated corner bracket. Indeed, if it is desired to permit one rail to be removed for purposes of gaining access to the housing interior, indentations of the type effected by the center punch of FIGURE 14 should be left off of the rail which is to be removed.

The type of corner locking arrangement shown in FIGURE 14 achieves a rigid structure similar to that achieved by turning down screw 32 (see FIGURE 3); but has the advantage that the screw 32 can be utilized for other purposes. More particularly, it will be seen that the corner bracket and its associated threaded aperturers 33–34 (see FIGURE 4) provides a convenient structure not only for assembling the side rails in relation to one another, but also for attaching a cover such as 16 to the assembled side rails. A screw such as 32 can be passed through a corner aperture in the cover (e.g., an aperture such as 17, in FIGURE 1), and then threaded into the underlying corner bracket so as to hold the cover in place.

Figures 7A, 7B:
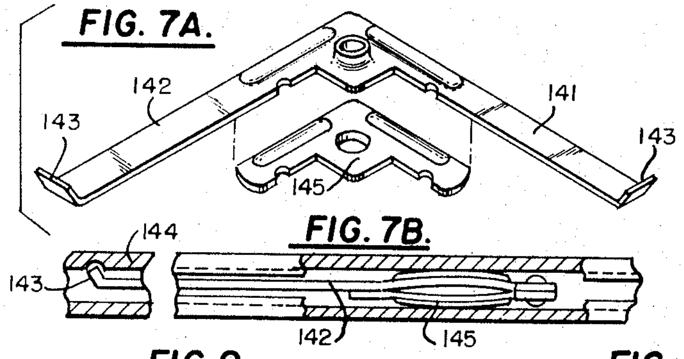
FIGURE 7A is an exploded perspective view of a modified form of corner bracket such as may be employed in the present invention.
FIGURE 7B is a side view of a modified bracket duct having a corner bracket of the type in FIGURE 7A inserted therein.

A still further locking arrangement is shown in FIGURES 7A and 7B wherein, by employing a modified form of corner bracket associated with a modified form of bracket duct, a resilient releasable type of lock can be achieved. More particularly, referring to FIGURE 7A, it will be seen that the corner bracket can have one of its parts provided with legs which are substantially longer than those previously discussed in reference to FIGURES 4 through 4C inclusive. These longer legs are designated 141 and 142 in FIGURE 7A. Each of said legs 141 and 142 is preferably formed of a springy or resilient material, and each leg is provided at its outermost end with an upstanding hook portion 143. One part only of the corner bracket need be constructed in this manner; and the other part, designated 145 in FIGURE 7A, can take the form of construction already described in reference to FIGURES 4 through 4C.

The bracket duct in the side rails can be provided with a punched or sawn depression or slot such as is illustrated at 144 (FIGURE 7B); and said depression or slot 144 is adapted to receive the hook portion 143 in the manner illustrated in FIGURE 7B. When the superposed corner bracket parts are inserted into the bracket duct (see FIGURE 7B), the corner bracket parts cooperate to resiliently urge an elongated leg such as 142 in a direction tending to effect engagement between the hook portion 143 and the bracket duct depression or slot 144. Accordingly, the modified corner bracket shown in FIGURES 7A and 7B may be slidably inserted into the bracket duct until the hook portion 143 snaps into engagement with the depression or slot 144; and the resulting engagement between the corner bracket and its associated bracket duct forms a more rigid structure than would be achieved by the corner bracket shown in FIGURE 4 alone. The engagement between hook portion 143 and bracket duct slot or depression 144 is releasable, and if the corner bracket is pulled outwardly, the force thus exerted causes arm 142 to flex, disengaging parts 143, 144 and permitting separation of the rails.

A circuit board can be mounted adjacent the uppermost or lowermost extremity of an assembled housing, if it is desired to so position a circuit board in addition to circuit boards retained within the housing on their associated supporting grooves. This type of assembly is shown in FIGURE 6. As there illustrated, a pair of adjacent side rails **11*a*, 13*a* (and other side rails of similar construction used to form a complete housing) may be held in assembled relation adjacent their corners by corner brackets such as 30*a* having their arms inserted into bracket ducts such as 40 and 41 provided on the interior surfaces of side rails 11*a* and 13*a* respectively. A housing so assembled may slidably receive a circuit board such as is designated 14*a*. In addition, a further circuit board such as 42 can be positioned on top of the housing, and attached to the housing by means of screw members such as 43 passing through the circuit board 42 into engagement with the threaded apertures provided in the adjacent corner brackets 30*a*. The arrangement of FIGURE 6 is, of course, illustrative of the manner in which a cover plate such as 16** can also be attached to an upper or lower extremity of an assembled housing, as has already been described.

In order to facilitate the mounting of components within an assembled housing, or to attach a cover or circuit board to portions of the side rails other than at their corners, one or more slide nuts of the type shown in FIGURE 5 can be disposed within a given bracket duct. Such a slide nut is constructed as described in reference to FIGURES 4 through 4C (and can take a form similar to that described in reference to FIGURES 7A and 7B), except that the slide nut has only one arm adapted to be inserted into a single given bracket duct. More particularly, a typical slide nut of the type used in conjunction with the present invention may comprise a pair of superposed members 44 and 45 provided with arms 46 and 47 adapted to be superposed in oppositely bowed relation in the manner already discussed in reference to FIGURE 4A. The slide nut elements 44 and 45 may be held in assembled relation by a screw member 48 passing through threaded apertures provided in each of said members 44 and 45. Once such a slide nut is assembled, with or without its screw 48, it can be inserted into a given bracket duct and slipped to an appropriate position along the edge of said duct. When so inserted in place, the arms 46–47 of the slide nut firmly hold the same in place. The threaded aperture of the slide nut is then disposed at a position interior of the side rail suitable for attaching a panel, bracket, or cover member thereto. By way of example, a cover member such as 16, rather than having holes 17 at one or more of its corners, can have a hole provided at a position such as is designated **17*a* in FIGURE 1; and such a cover can be retained in place by inserting a screw through the hole 17*a*** into threaded engagement with an underlying slide nut.

Various fittings of types adapted for insertion into the bracket ducts of a given side rail are depicted in various of the figures. A given bracket duct may have a corner bracket 50 inserted therein (see FIGURE 14). It may also have a slide nut such as 51 inserted therein (see FIGURE 6). In addition (see FIGURE 9), the bracket duct may receive and retain other fittings, e.g., an L-shaped bracket 52 having an outstanding apertured portion **52*a*. The bracket 52 may be held in place by means of a self-tapping screw 52*b* which is threaded between the opposing edges of the bracket duct in a direction transverse to the direction of elongation of said duct. The bracket duct (see FIGURE 9) can also receive a self-tapping screw such as 53 in directions coaxial with the bracket duct. Screws such as 53 are not generally needed, but may be useful for the attachment or removal of flat end rails, when these are preferred. Similarly, self-tapping screws such as 52*b* and/or 53** can be used to attach any of a wide variety of components such as switches, potentiometers, plugs, etc., to the side rails. Such screws can, moreover, be used to join plural side rails together in any desired configuration when it is preferred to assemble the rails, or housings, with screws, rather than with resilient corner brackets.

Figures 8, 8A:
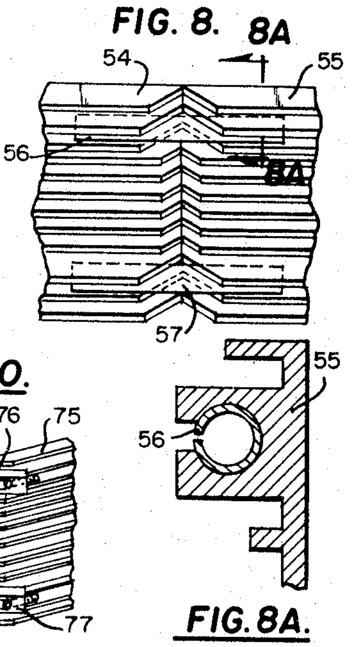
FIGURE 8 is a detailed view illustrating how a pair of side rails may be longitudinally joined to extend the side of a housing.
FIGURE 8A is an enlarged cross-section view taken on line 8A—8A of FIGURE 8.

By appropriate choice of other fittings, the side rail elements may, through the agency of the aforementioned bracket ducts, be assembled in a wide variety of configurations. This permits standard rails of relatively few sizes, kept in stock, to be used in fabricating housings of many different shapes and dimensions; and also permits any given housing, once assembled, to be expanded or otherwise dimensionally altered in whole or in part as desired. For example, a pair of side rails may be positioned in longitudinal relation to one another, and held assembled in such relation, by the use of a roll pin inserted into adjacent bracket ducts and extending between the casing bracket ducts of the aligned side rails. An assembly of this type is shown in FIGURES 8 and 8A wherein a pair of aligned side rails 54 and 55 are held in place relative to one another by means of a pair of elongated roll pins 56 and 57 having their opposing ends inserted into the bracket ducts of said side rails and extending therebetween. When so assembled, the resulting side rail structure is identical functionally to a given one of the side rails shown in FIGURE 1, but is longer than any given one of said side rails. This permits any longitudinal dimension of a housing to be extended, as desired, using previously stocked standard length side rails.

Figure 9:
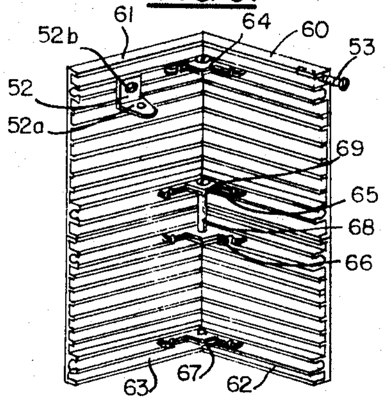
FIGURE 9 is a perspective view illustrating how side rails may be assembled in superposed relation to one another to fabricate a housing having a greater height than that provided by any single side rail.

Side rails of the types described can also be assembled in superposed relation to one another so as to give a resulting housing structure which is effectively higher than that which could be provided by any single side rail in stock. An arrangement of this type is shown in FIGURE 9, wherein a pair of side rails 60–61 (assembled in a configuration generally similar to that already described in reference to FIGURE 6) overlie a similar pair of assembled side rails 62–63. The side rails 60–61 are held together by a pair of resilient corner brackets 64, 65; and similarly the side rails 62, 63 are held together by a further pair of resilient corner brackets 66, 67. Vertical stacking of the side rails is achieved by providing a sleeve member 68 between the superposed corner brackets 65 and 66; and a screw member 69 may pass from one to the other of the corner brackets 65 and 66 through sleeve 68, so as to hold the structure in assembled relation.

It will be appreciated, of course, that an arrangement of the type shown in FIGURE 9 would be provided at each corner of the structure where vertical stacking occurs. It will further be appreciated that, in some housings, different vertical portions may be at different heights depending on the number of side rails which are so stacked.

Vertical stacking of the type shown in FIGURE 9 may, of course, be achieved by other arrangements. By way of example, and returning to FIGURE 3, it will be seen that a pair of side rails 10*a*, 10*b* can be held in superposed vertically stacked relation to one another by means of an elongated U-shaped channel 70 inserted into grooves such as 25 and 26 (see FIGURE 2) of the superposed side rails. The channel 70 may be fabricated of extruded aluminum, or may, in the alternative, be resilient in nature; and said channel 70 preferably has inwardly extending edges adapted to lock behind the lips 26*b*, as illustrated. A typical channel 70 may, moreover, be appreciable in length, thereby effecting a junction between the superposed side rails over a longer dimension than is achieved by the corner attachment arrangement of FIGURE 9.

Figure 10:
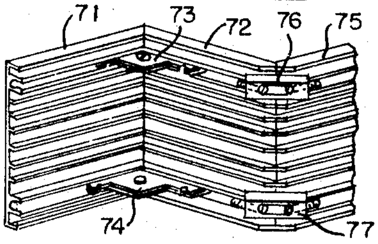
FIGURE 10 is a perspective interior view showing how corner brackets and reverse corner brackets may be associated with side rails constructed in accordance with the present invention to provide housings of L or U shape.
Figure 10A:
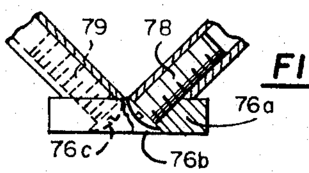
FIGURE 10A is a detailed view showing the construction and arrangement of a reverse corner bracket such as may be employed in the configuration of FIGURE 10.

Side rails constructed in accordance with the present invention may, moreover, be assembled to exhibit interior angles of 90° and also of 270°, thereby permitting the fabrication of housings having various desired dimensions and configurations. By way of example, referring to FIGURES 10 and 10A, it will be seen that a first pair of side rails 71 and 72 can be attached to one another by appropriate resilient corner brackets 73 and 74 (of the types already described in reference to FIGURE 4) so as to provide a first corner having an interior angle of 90°. The side rail 72 can further be assembled to another side rail 75 by means of reverse corner brackets 76 and 77 arranged to give the resultant corner configuration an interior angle of 270°. The corner brackets 76 and 77 each take the form shown in FIGURE 10A. More particularly, they comprise plate members 76*a* having a pair of inclined orifices 76*b* and 76*c* extending along lines describing an interior angle of 270° and an exterior angle of 90°. A pair of self-tapping screws 78 and 79 may be passed through the orifices 76*b* and 76*c* into threaded engagement with the bracket ducts in adjacent side rails such as 72 and 75. It will be appreciated, of course, that since the corners of each side rail are mitred at 45°, the side rails 72 and 75, when assembled in the configuration shown in FIGURE 10, will describe an elongated continuous edge which faces upon the interior planar surfaces of each reverse corner bracket 76 and 77.

Figure 11:
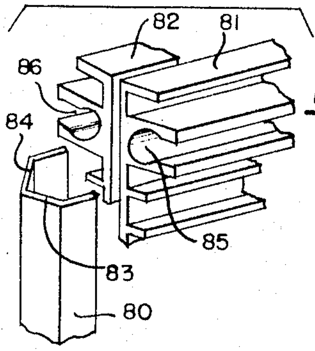
FIGURE 11 is an exploded detail view illustrating how a pair of side rails constructed in accordance with the present invention may be assembled in side-to-side relation to one another.

The side rails can also be assembled in side-by-side relation to one another, with their normally exterior surfaces in abutment. This consideration, in effect, permits two or more cases to be attached to one another in juxtaposed relation. As shown in FIGURE 11, such an assembly may be effected by snapping a spring-like bracket member 80 over the adjacent edges of two juxtaposed rail members 81 and 82. The 45° mitred cuts provided at the ends of the rail members 81 and 82 conform to the configuration shown at edges 83 and 84 of bracket 80. The bracket 80 is preferably snapped into place over portions of the circuit board supporting grooves below the bracket ducts 85 and 86 of the side rails 81, 82; and the mitred configuration of the side rail ends, and the conforming shapes of the edges 83 and 84 in bracket 80, therefore permit further side rails to be attached to the assembled side rails 81 and 82 in overlying relation to the bracket 80. Once the bracket 80 is assembled in the manner depicted in FIGURE 11, therefore, it may be completely concealed by adding further side rails over the exterior surface of edges 83 and 84, with these further side rails being appropriately attached through their bracket ducts to the bracket ducts 85 and 86.

Figure 12:
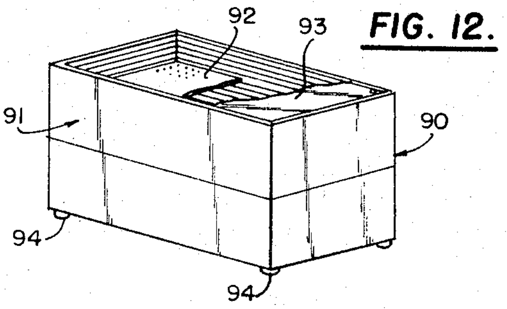
FIGURE 12 is a perspective view, partially broken illustrating vertically stacked cases constructed in accordance with the present invention.

FIGURE 12 shows a vertically stacked case of the type which may typically result from assemblies of the type shown and described in reference to FIGURES 3 and/or 9. The casing includes, in effect, ends such as 90 which correspond to two end rails of the type previously designated 12 and 13 in reference to FIGURE 1. The side of the case, designated 91, constitutes superposed side rails such as 10 and 11 in FIGURE 1. The actual length and width dimensions of the sides 90 and 91 can be varied by longitudinally extending those sides in the manner described in reference to FIGURE 8. The resultant structure has an interior ribbed and grooved surface which can retain circuit boards such as 92; and covers such as 93 can also be placed on the structure. If desired, moreover, bumpers or rubber feet such as 94 can be attached at the lower side of the case by self-tapping screws, or by screws extending into the overlying corner brackets of the assembled structure.

Figure 13:
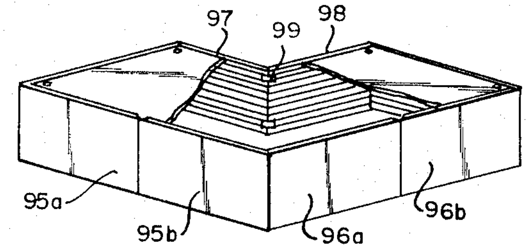
FIGURE 13 is a perspective view, partially broken showing an L shaped case constructed from the standard components of the present invention.

Another case configuration, fabricated by using components and techniques of the types described previously, is illustrated in FIGURE 13. In this arrangement, the housing is of generally L-shaped configuration. The side 95*a*, 95*b* of the housing, and the side 96*a*, 96*b* thereof, in effect, each comprise a pair of side rail members assembled in longitudinal relation, in the manner described in reference to FIGURES 8 and 8A. The opposing sides of the case, designated 97 and 98, each correspond to a single one of the side plate members 95*a*, 95*b* and 96*a*, 96*b*; and are attached by reverse corner brackets 99 taking the configuration already described in reference to FIGURES 10 and 10A. The end plates of the structure, the covers, circuit boards, etc., may all be of the form described previously in reference to other of the figures. Partitions wtihin any case may also be quickly added by using only the extruded side rails described, along with corner brackets at each junction.

Various modifications in the assembly of the standard components here contemplated can, of course, be readily made by employing vertical stacking, longitudinal assembly, side-by-side assembly, reverse corner assembly, etc.; and the actual shape, size and configuration of any given case is limited only by the ingenuity and needs of the person assembling the components of the present invention.

While I have thus described preferred embodiments of my invention, many variations will be suggested to those skilled in the art; and certain of these variations have in fact already been described. It must, therefore, be understood that the foregoing description is meant to be illustrative only, and is not limitative of my invention; and all such variations and modifications as are in accord with the principles described are meant to fall within the scope of the appended claims.

Having thus described my invention, I claim:

1. A metallic housing element for use with similar such housing elements in assembling a housing for electrical components comprising an elongated rectangular metal plate having a pair of opposed first relatively elongated parallel edges and a pair of opposed second relatively narrower parallel edges extending at substantially right angles to said first edges, said narrower edges being mitre cut at an angle and in opposite directions with respect to one another, one surface of said elongated metal plate defining a plurality of integral elongated metallic ribs outstanding from said one surface and extending in generally parallel relation to one another between said mitre cut narrower edges in directions parallel to said first relatively elongated edges of said plate, said elongated integral ribs including a plurality of first ribs disposed in directly adjacent relation to one another and outstanding from said surface by a first distance, said plurality of directly adjacent first ribs defining a first plurality of grooves therebetween each of which is adapted to slidably receive the edge of a circuit board therein, said integral elongated ribs including a pair of second ribs outstanding from said surface by a second distance greater than said first distance and defining a pair of second grooves adapted to receive a mechanical fastener for mechanically interconnecting a pair of said housing elements to one another, said pair of second grooves being located adjacent said first relatively elongated edges of said plate, respectively, with said first plurality of grooves being located between said pair of second grooves.

2. The structure of claim 1 wherein said first grooves are of substantially rectangular cross-section, said second grooves being of rounded cross-section.

3. The struction of claim 1 wherein said first relatively elongated edges each include an integral transverse flange overlying an adjacent one of said second ribs thereby to define a pair of further grooves located between said first edges and said second grooves respectively for slidably receiving the edges of planar structures forming portions of said assembled housing.

4. The structure of claim 3 wherein at least one of said further grooves is of substantially rectangular cross-section.

5. The structure of claim 3 wherein at least one of said further grooves includes an enlarged interior portion operative to positively engage a complementary edge of a planar structure slidably inserted therein.

6. A rail structure for use with similar such rail structures in assembling a housing, said rail structure comprising a rectangular plate having a pair of first opposed generally parallel edges and a pair of second opposed generally parallel edges extending between said first edges, said second edges each being mitre cut at an angle and in opposite directions with respect to one another whereby said plate has opposing surfaces of differing areas, the smaller area surface of said plate defining a plurality of integral elongated ribs outstanding from said surface and extending in generally parallel relation to one another in directions parallel to the first edges of said plate, said elongated ribs defining a first plurality of grooves therebetween adapted to slidably receive the edges of circuit boards, said elongated ribs also defining a pair of second grooves of different cross-sectional configuration from said first grooves and adapted to receive mechanical fasteners for holding said rail structures together when said housing is assembled, said pair of second grooves being located in relatively widely spaced relation to one another adjacent said first edges of said plate respectively, with a plurality of said first grooves being located in adjacent relation to one another between said relatively widely spaced second grooves.

7. The structure of claim 6 wherein the ribs defining said second grooves are outstanding from the smaller area surface of said plate by a dimension greater than the dimension of the ribs defining said first grooves.

8. The structure of claim 6 wherein each of said ribs extends continuously from one to the other of said mitre cut second edges of said plate.

9. The structure of claim 6 wherein said plate and ribs comprise unitary portions of an extruded metal structure.

10. A housing structure for electrical components comprising at least four extruded metal plate members of rectangular shape juxtaposed in separable relation to one another to form a rectangular frame, each of said extruded plate members having a ribbed interior surface comprising an integral portion of said plate member and providing a plurality of first elongated grooves mating with like first elongated grooves in the adjacent ones of said plate members when said plate members are juxtaposed to form said frame, thereby to form a plurality of superposed grooves extending substantially continuously from one to the next of said separable plate members for supporting circuit boards within said frame, each of said extruded plate members further including pairs of integral ribs forming connector ducts located adjacent the junction of two adjacent ones of said plate members at positions outside the plurality of superposed grooves in each of said plate members, each of said connector ducts being outstanding from the plane of its associated plate member by a distance greater than the depth of said grooves in said plate member, the connector ducts in each of said plate members being positioned in substantially mating relation with like connector ducts in the adjacent ones of said plate members when said plate members are juxtaposed to form said frame, and means for holding said plate members in assembled relation in said frame, said holding means comprising a plurality of L-shaped mechanical connector means each of which has two legs disposed at substantially right angles to one another, one of said legs being slidably inserted into a connector duct in one of said separable plate members and the other of said legs being slidably inserted into a connector duct in an adjacent one of said separable plate members, each of said legs including an outwardly bowed portion adapted to resiliently engage interior surface portions of its associated connector duct, and each of said holding means including locking means adapted to lock said L-shaped connector means at a desired fixed position relative to its associated connector ducts.

11. The structure of claim 10 wherein said locking means for each of said holding means comprises an outstanding hook portion on at least one of said legs adapted to engage a complementary recess within one of said connector ducts.

12. The structure of claim 10 wherein said locking means for each of said holding means comprises a depression in at least one of said legs adapted to receive a mechanically deformed portion of one of said connector ducts.

13. A housing structure for electrical components comprising at least four rectangular plate members juxtaposed in separable relation to one another to form a rectangular frame, each of said plate members having a ribbed interior surface providing a plurality of first elongated grooves mating with like first elongated grooves in the adjacent ones of said separable plate members when said plate members are juxtaposed to form said frame, thereby to form a plurality of superposed grooves extending substantially continuously from one to the next of said plate members for supporting circuit boards within said frame, each of said plate members further including ribs forming a connector duct located adjacent the junction of two adjacent ones of said separable plate members, each of said ducts being outstanding from the plane of said plate member by a distance greater than the depth of said grooves, the connector ducts in each of said plate members being positioned in substantially coplanar relation to like connector ducts in the adjacent ones of said plate members when said separable plate members are juxtaposed to form said frame, and means for holding said plate members in assembled relation in said frame comprising removable mechanical fasteners having unitary portions extending at interior portions within said frame from a connector duct in one of said plate members to a connector duct in an adjacent one of said plate members.

14. The structure of claim 13 wherein at least two of said plate members are positioned in coplanar horizontally aligned relation to one another, said mechanical fasteners comprising an elongated pin extending horizontally between ducts in said two plate members across the juxtaposed vertical edges of said horizontally aligned plate members.

15. The structure of claim 13 wherein at least two of said plate members are positioned at substantially right angles to one another, said mechanical fasteners comprising an L-shaped corner bracket extending between ducts in said two plate members, said bracket including portions frictionally engaging interior surface portions of said ducts.

16. The structure of claim 13 wherein at least two of said plate members are positioned in coplanar vertically aligned relation to one another.

17. A housing structure for electrical components comprising a plurality of rectangular plate members separably disposed adjacent one another to form a frame, at least one removable rectangular planar structure within said frame, each of said plate members having a ribbed interior surface providing a plurality of elongated grooves, the grooves on each of said plate members mating with like elongated grooves in the adjacent ones of said plate members in said frame to form grooves extending substantially continuously from one to the next of said separable plate members for slidably supporting side and end edges of said planar structure within said frame along said continuously extending grooves, each of said plate members further including connector ducts integral with said plate member, the connector ducts of each of said plate members being positioned closely adjacent to and in substantially mating relation with the connector ducts in an adjacent one of said plate members, and removable bracket means having unitary portions extending between and engaging interior surface portions of the substantially mating connector ducts of adjacent ones of said plate members for holding said plate members in assembled relation in said frame.

18. The structure of claim 17 including removable cover means on said frame, and separable fastener means extending from said cover means into engagement with at least one of said bracket means, whereby said bracket means performs the dual function of holding said plate members in assembled relation, and of holding said cover means on said assembled plate members.

19. The structure of claim 17 wherein said planar structure slidably supported along said grooves within said frame comprises a circuit board.

20. A housing structure for electrical components comprising a plurality of separable elongated rectangular plates each of which has a pair of opposed relatively elongated parallel edges and a pair of opposed relatively narrower parallel edges extending between said elongated edges, said narrower edges of each of said plates being mitre cut at an angle and in opposite directions with respect to one another, said plurality of plates being separably juxtaposed with the mitre cut narrower edges of adjacent ones of said plates being in engagement with one another, the inner surface of each of said elongated plates defining a plurality of elongated ribs extending in generally parallel relation to one another between the mitre cut narrower edges of said plate and in directions parallel to said relatively elongated edges of said plate, said elongated ribs on each of said plates being outstanding from said inner surface and defining a first plurality of grooves, the first plurality of grooves in each of said plates having corresponding such grooves in the others of said plates whereby said first pluralities of grooves extend substantially continuously from one to the next of said plates, a rectangular circuit board having a pair of side edges and a pair of end edges, said circuit board being slidably disposed in one of said continuously extending first grooves and having both of its side edges and at least one of its end edges supported in portions of said continuously extending first groove adjacent different ones of said plates respectively, said elongated ribs on each of said plates defining at least one second groove having a cross-sectional configuration different from that of said first grooves, said second groove in each of said plates having a corresponding such second groove in the others of said plurality of plates, mechanical fastener means extending between the corresponding second grooves of adjacent ones of said plates and across the adjacent mitre cut narrower edges of said adjacent plates, and at least one cover plate structure extending in a plane parallel to that of said circuit board and engaging each of a plurality of said separable plates adjacent one of their relatively elongated edges respectively.

21. A housing structure adapted to support circuit cards therein, comprising a plurality of separable rectangular plates each of which has a pair of opposed relatively elongated edges interconnected by a pair of opposed relatively narrow edges extending between said elongated edges, at least one of said relatively narrow edges on each of said plates being inclined at an angle of substantially 45° to permit two of said plurality of plates to be juxtaposed at their said inclined edges to form a 90° corner structure during assembly of said separable plates into said housing structure, one surface of each of said plates defining a plurality of elongated ribs extending in generally parallel relation to one another between said relatively narrow edges and in directions parallel to said relatively elongated edges of said plate, said ribs on said plurality of plates defining elongated grooves extending substantially continuously from one to the next adjacent one of said plates when said plates are assembled into said housing structure, at least one circuit card having its edges supported in one of said substantially continuously extending grooves, means on each of said plates defining channels opening into each of the relatively narrow edges of said plate, mechanical fastener means engaging the channels of adjacent ones of said plates and extending between juxtaposed ones of said plates across their respective narrow edges to hold said plates in assembled relation in said housing structure, means adjacent the relatively elongated edges of each of said plates defining a further groove extending substantially continuously from one to the next of said assembled plates, and a cover plate slidably inserted in said substantially continuously extending further groove, said cover plate extending in a plane substantially parallel to the plane of said circuit card.

References Cited by the Examiner

UNITED STATES PATENTS

| | | | |
|---|---|---|---|
| 2,657,968 | 11/1953 | Soehner | 312—330 |
| 2,832,942 | 4/1958 | French | 317—101 |
| 2,893,137 | 7/1959 | Alling et al. | 317—101 |
| 3,093,259 | 6/1963 | Morrison | 320—4 X |
| 3,222,117 | 12/1965 | Schwartz | 312—350 |
| 3,243,245 | 3/1966 | Kewley | 312—108 |

FOREIGN PATENTS

| | | |
|---|---|---|
| 1,264,178 | 8/1961 | France. |

ROBERT K. SCHAEFER, *Primary Examiner.*

M. GINSBURG, *Assistant Examiner.*